(12) United States Patent
Kline

(10) Patent No.: US 10,893,154 B2
(45) Date of Patent: Jan. 12, 2021

(54) PERSONALIZED SOUVENIR PRODUCING INTERACTIVE KIOSK SYSTEM

(71) Applicant: Alicia Kline, N. Las Vegas, NV (US)

(72) Inventor: Alicia Kline, N. Las Vegas, NV (US)

( * ) Notice: Subject to any disclaimer, the term of this patent is extended or adjusted under 35 U.S.C. 154(b) by 0 days.

(21) Appl. No.: 16/425,903

(22) Filed: May 29, 2019

(65) Prior Publication Data

US 2020/0382653 A1    Dec. 3, 2020

(51) Int. Cl.
*H04N 1/00* (2006.01)
*G07F 17/26* (2006.01)
*G07F 17/00* (2006.01)

(52) U.S. Cl.
CPC ....... *H04N 1/0019* (2013.01); *G07F 17/0014* (2013.01); *G07F 17/26* (2013.01); *H04N 1/00143* (2013.01); *H04N 1/00177* (2013.01)

(58) Field of Classification Search
CPC .................................................... H04N 1/0019
USPC ....................................................... 358/1.15
See application file for complete search history.

(56) References Cited

U.S. PATENT DOCUMENTS

| 5,687,087 A * | 11/1997 | Taggart | G07F 17/26 |
| | | | 235/381 |
| 6,508,904 B1 | 1/2003 | Charley | |
| 7,370,076 B2 | 5/2008 | Friedman | |
| 7,734,499 B1 | 6/2010 | Mudrick | |
| 8,626,614 B2 | 1/2014 | Barber | |
| 2004/0195455 A1* | 10/2004 | Maida | G03B 17/53 |
| | | | 244/129.1 |
| 2006/0222858 A1* | 10/2006 | Haas | B43L 1/123 |
| | | | 428/413 |
| 2007/0201103 A1 | 8/2007 | Morgan | |
| 2009/0266901 A1 | 10/2009 | Dinc | |
| 2016/0282239 A1* | 9/2016 | Capps | G01N 1/312 |
| 2017/0132683 A1* | 5/2017 | Gunderson | G06Q 30/0621 |

* cited by examiner

*Primary Examiner* — Jacky X Zheng
(74) *Attorney, Agent, or Firm* — Charles Runyan; Runyan Law

(57) ABSTRACT

A personalized souvenir producing interactive kiosk system and method of producing a personalized souvenir using the personalized souvenir producing interactive kiosk system. The system includes a vending machine-like kiosk configured to communicate with a user's electronic device, such as a smartphone, to accept an upload of a user-selected digital image. The kiosk then creates a personalized souvenir in the form of a refrigerator magnet using the digital image and printing the digital image on a section of magnetic sheeting.

1 Claim, 5 Drawing Sheets

PERSONALIZED SOUVENIR PRODUCING INTERACTIVE KIOSK SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of kiosks and vending machines and more specifically relates to a souvenir producing kiosk.

2. Description of Related Art

Often times when individuals go on vacations or to a special event, they purchase souvenirs. There are many opportunities to purchase or otherwise acquire some item that commemorates or reminds them of their experience. There are many types of souvenirs on the market today. Many of these souvenirs are generic and do not 'stand out' as something special. Therefore, it is desirous to have a souvenir that is personalized, for example, with a consumer's name. Moreover, souvenir retailers want to provide customers with a souvenir that is attractive and produces high sales. A need exists for producing and vending such souvenirs. A suitable solution is desired.

U.S. Pub. No. 2004/0195455 to Michael Maida relates to an interactive kiosk for producing postcards from digital images stored on removable digital camera memory media. The described interactive kiosk for producing postcards from digital images stored on removable digital camera memory media includes an interactive kiosk that permits the user to create custom postcards composed of photographs taken with the user's own digital camera. The postcards will be printed instantly by reading the memory (via camera's memory card or by wire transfer or infrared transfer of images) of the user's digital still or video camera. The kiosk contains a programmed computer that guides the user through the transfer and postcard creation process. The photograph/s will be printed in high quality color or black and white on one side with various options for borders and text messages. The back of the postcard will resemble a traditional postcard with space for a message to the recipient and the recipient's address.

BRIEF SUMMARY OF THE INVENTION

In view of the foregoing disadvantages inherent in the known kiosk and vending machine art, the present disclosure provides a novel personalized souvenir producing interactive kiosk system. The general purpose of the present disclosure, which will be described subsequently in greater detail, is to provide a kiosk configured to communicate with a user's digital device, such as smartphone, to accept an upload of a desired digital image to create a custom souvenir-style magnet using the digital image. The upload may take place via BLUETOOTH, wireless internet and/or a transfer cable.

A personalized souvenir producing interactive kiosk system is disclosed herein. The personalized souvenir producing interactive kiosk system is used to create custom, on-demand, souvenir-style magnets using consumer-transmitted photographic images. The system includes a vending machine-like kiosk having a user interface providing a user-interactive display (able to be manipulated by a consumer), a payment receiving and processing system for accepting and processing payment from a user, a powering source, a digital input receiver for receiving a digital-image from an electronic device, a housing storing a supply of magnetic sheeting, a printer configured to print a user-selected digital image on a section of the supply of magnetic sheeting stored in the kiosk in response to receiving the digital-image and the payment from the user, and a central processing unit controlling functions of the printer, and a dispenser tray for dispensing and delivering a personalized refrigerator magnet souvenir to the user.

The kiosk includes at least one port for receiving a transfer cable in order to upload a digital image for use. The vending machine further includes BLUETOOTH technology and means for wireless connectivity as additional options for connecting to a camera, a smartphone, tablet, or other electronic device.

A method of producing personalized souvenirs using a personalized souvenir producing interactive kiosk system is also disclosed herein. The method may comprise the steps of: providing a personalized souvenir producing interactive kiosk system including a kiosk having a user interface providing a user-interactive display, a payment receiving and processing system, a powering source, a digital input receiver for receiving a digital-image from an electronic device, a housing storing a supply of magnetic sheeting, a printer configured to print a user-selected the digital image on a section of the supply of magnetic sheeting stored in the kiosk in response to receiving the digital-image and the payment from the user, and a central processing unit controlling functions of the printer; and a dispenser tray for dispensing and delivering a personalized souvenir to the user; connecting the electronic device to the kiosk and establishing communication therebetween; selecting the digital image from the electronic device using the user interface; receiving payment via the payment receiving and processing system; printing the user-selected the digital image on the section of the supply of magnetic sheeting; and dispensing the personalized souvenir. The method may further include disconnecting the electronic device from the kiosk and restocking the supply of magnetic sheeting.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a personalized souvenir producing interactive kiosk system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a kiosks and more particularly to a personalized souvenir producing interactive kiosk system as used to provide a new and improved kiosk that allows a user to easily upload a desired digital image, and the kiosk will create and dispense a custom souvenir-style magnet from the uploaded image.

Generally, the personalized souvenir producing interactive kiosk system provides a vending device that accepts consumer-transmitted photographic images and creates customized magnets using the consumer-transmitted photographic images. The kiosk includes a printer, magnetic sheeting that feeds through this printer, and substrate coating upon this magnetic sheeting, upon which said printer applies its ink. An exterior-accessible touchscreen is featured on the kiosk and connects by wire to a central processing unit (CPU) of the device. A payment processer is featured within, and is accessible from the exterior of the kiosk, and is connected by wire to the central processing unit (CPU). The central processing unit (CPU) includes programming that remains in stable mode until activated by a user. This programming then provides instruction on how a user may upload image(s), then select layout of image(s), initiate payment, and begin printing. After payment and design of a personalized souvenir, production may be initiated.

In certain embodiments, the kiosk may produce hard magnets. In such variations, a material of the hard-magnet may feature various topcoat substrates capable of adhesion on such material. In further variation, the kiosk may simply print its image on adequate paper stock that is then applied by adhesive to the hard-magnet material. The system may include options in which a user may select and/or enter text upon an uploaded digital image that is to be applied upon a magnet during its printing. As a non-limiting example, the kiosk may feature a keyboard or keyboard-image program accessible through its touchscreen, which a user may use to enter the date the photograph was taken, the location where the photograph was taken, and/or the person(s) in the photograph, and such data will be applied as text during the printing. The personalized souvenirs may be made in variations that produce business-card magnets and/or advertising magnets, and which would include keyboard options to allow user entry of needed data and/or images.

The personalized souvenirs may be made in variations that allow a final magnet image to be distributed by the user via Internet and/or electronic mail. In such variations, a router for distribution through an Internet service provider (ISP) will be included. In yet another embodiment, the personalized souvenir producing interactive kiosk system may feature a built-in camera that will take a photo(s) of the user(s) for use in printing on a magnet.

Figure 1:
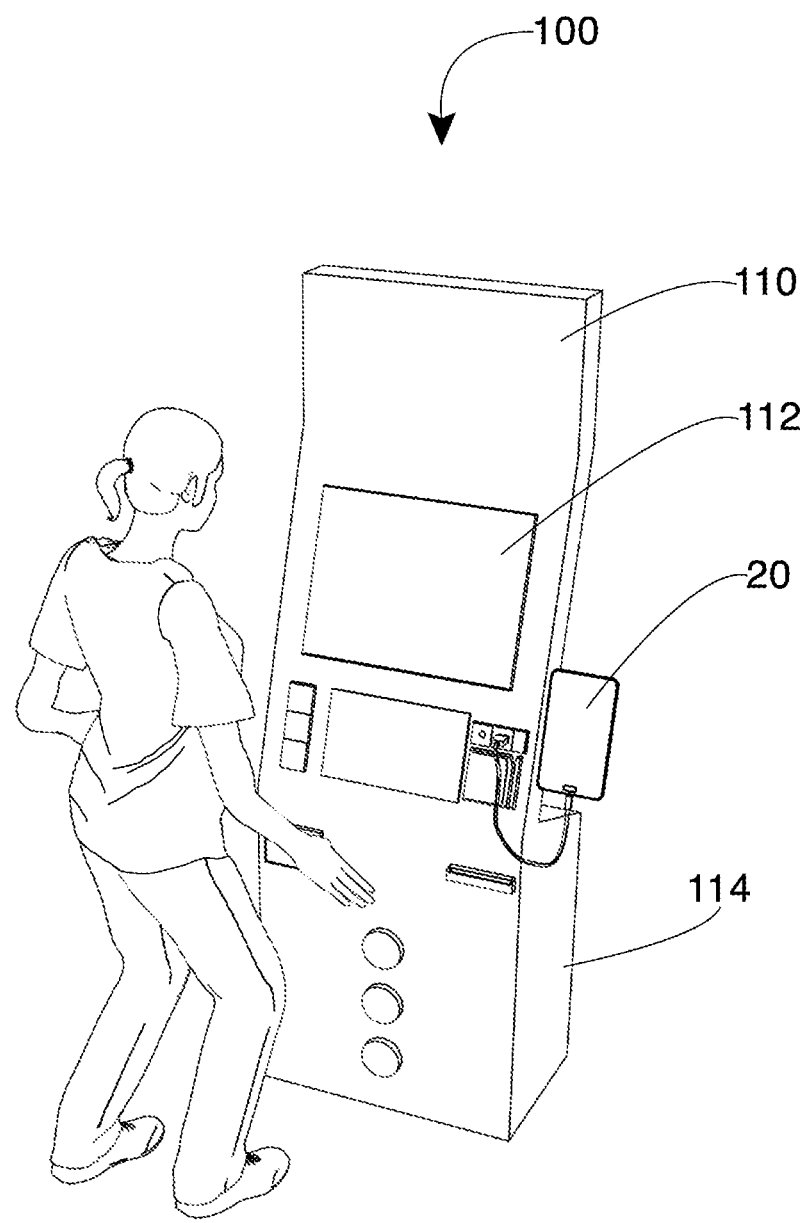
FIG. 1 is a perspective view of the personalized souvenir producing interactive kiosk system during an 'in-use' condition, according to an embodiment of the disclosure.

Referring now more specifically to the drawings by numerals of reference, there is shown in FIGS. 1-4, various views of a personalized souvenir producing interactive kiosk system 100. FIG. 1 shows a personalized souvenir producing interactive kiosk system 100, according to an embodiment of the present disclosure. As illustrated, the personalized souvenir producing interactive kiosk system 100 may include a kiosk 110 for producing a personalized souvenir 10. The kiosk 110 includes a user interface 112, a payment receiving and processing system 116, a powering source 120 such as a power cord for powering the kiosk 110, a digital input receiver for receiving a digital-image from an electronic device 20, a housing 114 storing a supply of magnetic sheeting 122, a printer 126 configured to print a user-selected digital image on a section of the supply of magnetic sheeting 122 stored in the kiosk 110 in response to receiving the digital-image and payment from the user, and a central processing unit 128 controlling functions of the printer 126, and a dispenser tray 130 for dispensing and delivering the personalized souvenir 10, specifically, a refrigerator magnet, to the user. Other such personalized souvenir(s) 10 may be produced in alternate embodiments. The kiosk 110 may be placed in many environments including but not limited to high-foot traffic destinations such as tourist destinations, amusement parks, national parks, hotels and casinos.

The user interface 112 provides a user-interactive display. In a preferred embodiment, the user interface 112 comprises a touchscreen digital display allowing the user to input information, make selections, and customize an order for the personalized souvenir 10. The user-interactive display displays a process sequence for guiding a user through a process of creating the refrigerator magnet. The payment receiving and processing system 116 is provided for accepting and processing payment from a user. The kiosk 110 is in communication with the electronic device 20 such that it is able to receive a digital-image from the electronic device 20.

Figure 2:
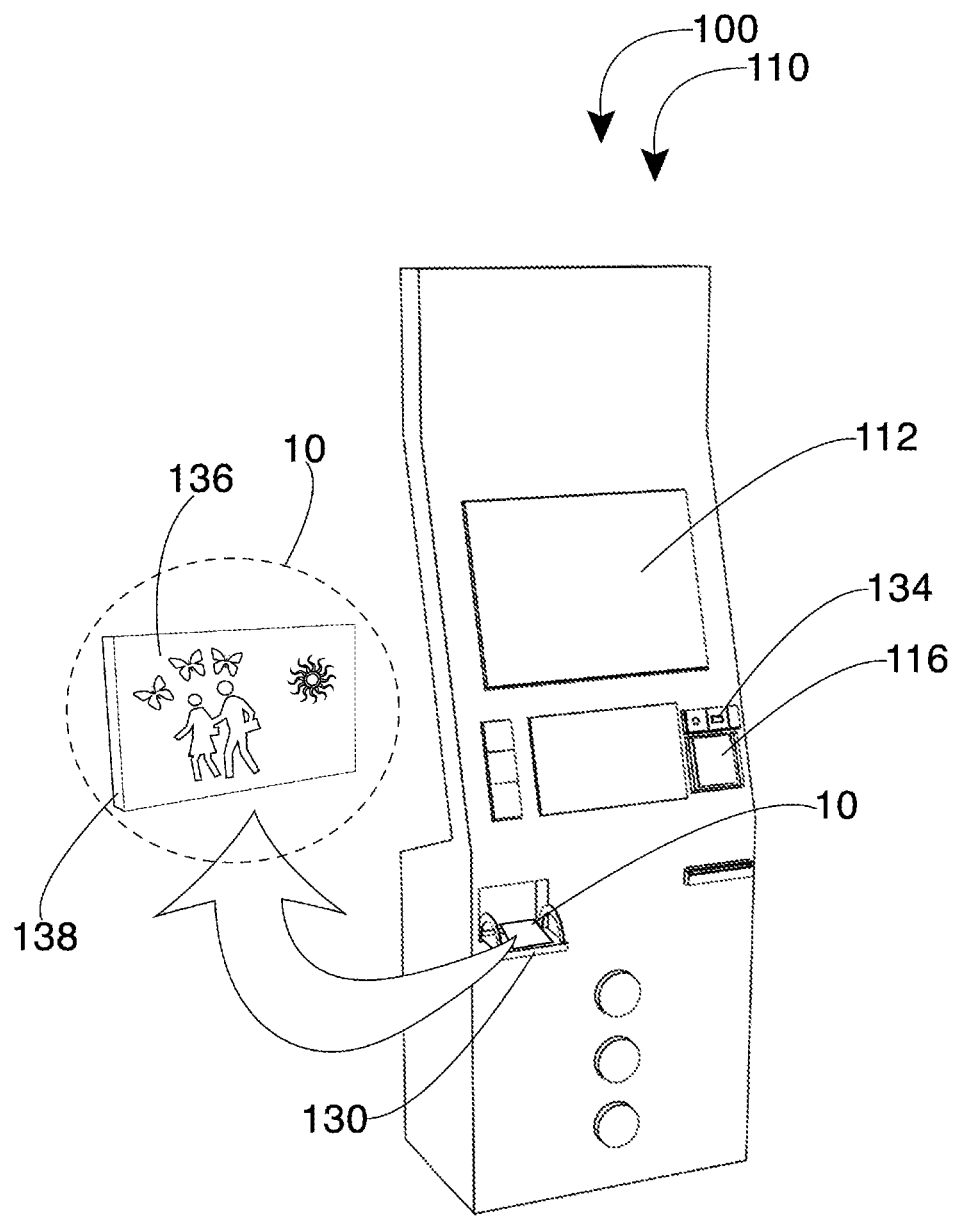
FIG. 2 is a front perspective view of the personalized souvenir producing interactive kiosk system of FIG. 1, according to an embodiment of the present disclosure.

FIG. 2 shows a perspective view of the personalized souvenir producing interactive kiosk system 100 of FIG. 1, according to an embodiment of the present disclosure. As above, the personalized souvenir producing interactive kiosk system 100 may include the kiosk 110 comprising the user interface 112, payment receiving and processing system 116, powering source 120, digital input receiver, dispenser tray 130, and housing 114 for the supply of magnetic sheeting 122, printer 126, and central processing unit 128. The payment receiving and processing system 116 is accessible from an exterior of the kiosk and includes a paper currency acceptor 117 for receiving and processing paper money payments and paper currency storage bin 118 for storage thereof. The payment receiving and processing system 116 further comprises a mag-stripe reader 132 for reading and processing payment from a payment-card such as a credit card or debit card. In other embodiments, the kiosk 110 is configured to accept other formats of electronic transactions, such as but not limited to PAYPAL, cryptocurrency, APPLE PAY, and other payment methods.

Figure 3:
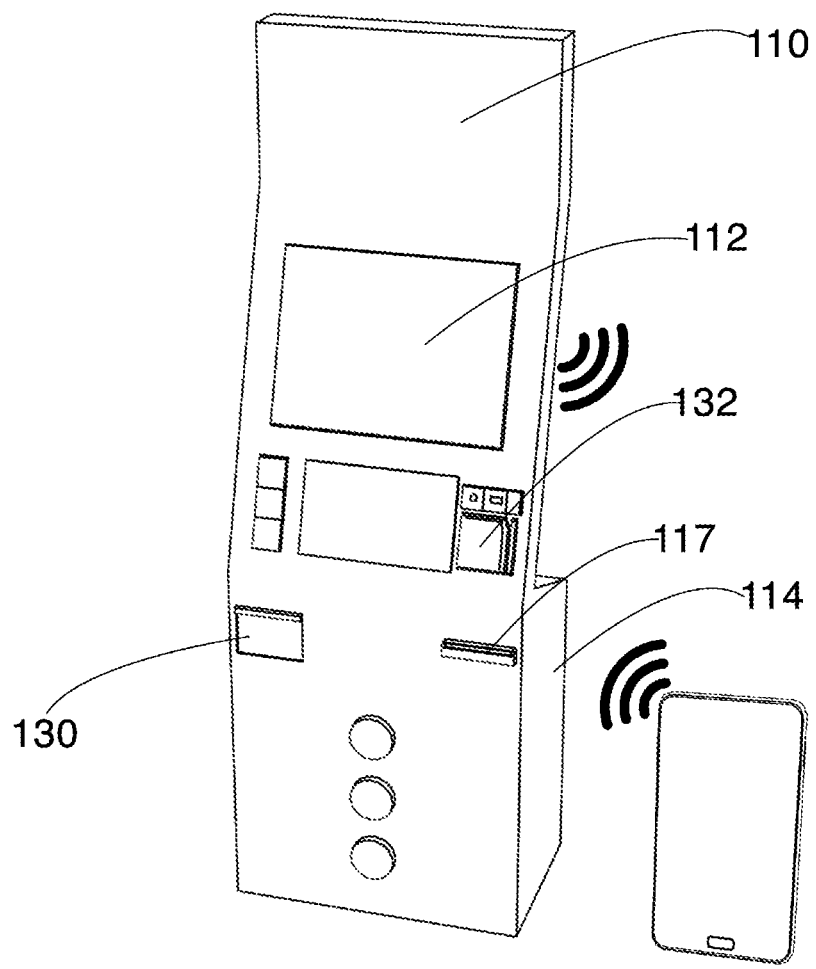
FIG. 3 is a front perspective view of the personalized souvenir producing interactive kiosk system of FIG. 1, according to an embodiment of the present disclosure.

FIG. 3 shows a perspective view of the personalized souvenir producing interactive kiosk system 100 of FIG. 1, according to an embodiment of the present disclosure. As above, the personalized souvenir producing interactive kiosk system 100 may include the kiosk 110 for designing and printing custom refrigerator magnets using a user-selected digital image. In a preferred embodiment, the kiosk 110 includes at least one port 134 such as a Universal Serial Bus port configured receive a transfer cable and connect with an electronic device 20 for receiving the user-selected digital-image from the electronic device 20. The user-selected digital-image is then transferred from the electronic device 20 to the central processing unit 128. The central processing unit 128 controls the printer and feeding of the supply of magnetic sheeting 122 within the kiosk 110. The kiosk 110 further comprises wireless communication capability and BLUETOOTH technology for communicating with a remote electronic device 20 and transmitting the digital-image to the central processing unit 128. Other suitable methods of uploading files from an electronic device 20 for printing may be used.

Figure 4:
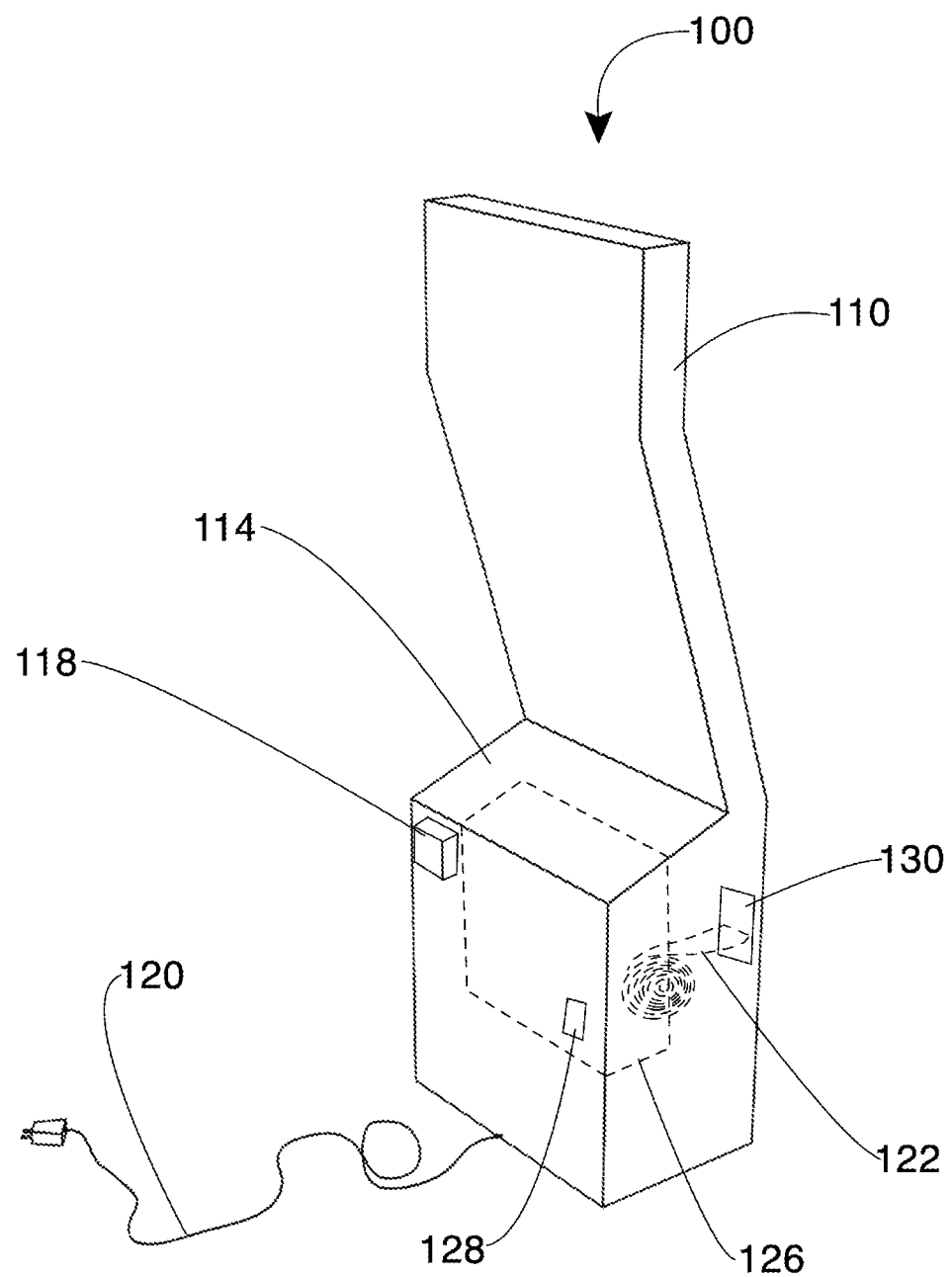
FIG. 4 is a rear perspective view of the personalized souvenir producing interactive kiosk system of FIG. 1, according to an embodiment of the present disclosure.

FIG. 4 shows a perspective view of the personalized souvenir producing interactive kiosk system 100 of FIG. 1, according to an embodiment of the present disclosure. The personalized souvenir producing interactive kiosk system 100 may include a kiosk 110 configured to print a variety of customizable designs to create a refrigerator magnet. In a preferred embodiment, internal metal components of the printer 126 and the kiosk 110 are coated with a non-stick material for aiding in effective dispensing of the personalized souvenir 10. The non-stick material may include paperboard coating, particle board coating, STYROFOAM, or the like to avoid interruption and interference in flow of magnetic material during printing. A non-metallic roller tray is also utilized. The non-magnetic roller tray accepts a finished individual unit of magnetic sheeting 122 and feeds the finished refrigerator magnet through a durable chute. This chute, dispenser tray 130, extends beyond the housing 114 for external distribution to the user.

As above, the personalized souvenir producing interactive kiosk system 100 may include a supply of magnetic sheeting 122 housed within the kiosk 110. In certain embodiments, the supply of magnetic sheeting 122 may be pre-cut into individual refrigerator magnets for printing the user-selected digital image thereon. The refrigerator magnets may be pre-cut in various sizes and shapes. In a preferred embodiment, quantities of these pre-cut magnet units are retained within a vertical chute and on a spring-loaded platform, made of polyvinyl chloride (PVC), that feeds them into a printer. In other embodiments the personalized souvenir producing interactive kiosk system 100 includes a cutting press for separating the supply of magnetic sheeting 122 into individual refrigerator magnet size sections of various sizes, shapes, and patterns for printing the user-selected digital image thereon.

The process of printing and dispensing is as follows: upon completion of the payment, the system 100 will release the spring-loaded platform that hosts magnetic sheeting segments until one of the magnetic sheeting segments enters the printer. The printer will then begin printing on that magnetic sheeting segment. Upon completion of the printing, that magnetic sheeting segment will be released upon the roller tray and ejected through the dispenser tray 130.

In addition to using user-selected digital images, the kiosk 110 may further comprise a database configured to store preprogrammed-templates, preprogrammed-images, and preprogrammed-backgrounds, borders, or other image add-ons for further customization of the personalized souvenir. The digital images may include a photograph, a graphic image, and/or preprogrammed-images to be used alone or in combination. The user may edit, adjust, crop, expand, reduce, or otherwise manipulate at least one of the digital images using the user interface. The system 100 may include photo enhancing programs for use by the user, such as grayscale, blue wash, and other image enhancement options.

The digital image is printed on a top-surface 136 of the refrigerator magnet opposing a magnetic base 138. The top-surface 136 may comprise a material such as but not limited to vinyl substrate, polyethylene (PET), and polyvinyl chloride (PVC) for ink including but not limited to solvent, eco-solvent, latex, and ultraviolet (UV) ink to be printed thereon. The personalized souvenir producing interactive kiosk system 100 may include options of a finish coating to be applied to a printed refrigerator magnet, and the coating may be of gloss or matte varieties. The kiosk 110 may further include an internal air blower, positioned to aerate the personalized souvenir 10 after individual production, and to ensure its ink has dried before dispensing the finished product to the user.

Figure 5:
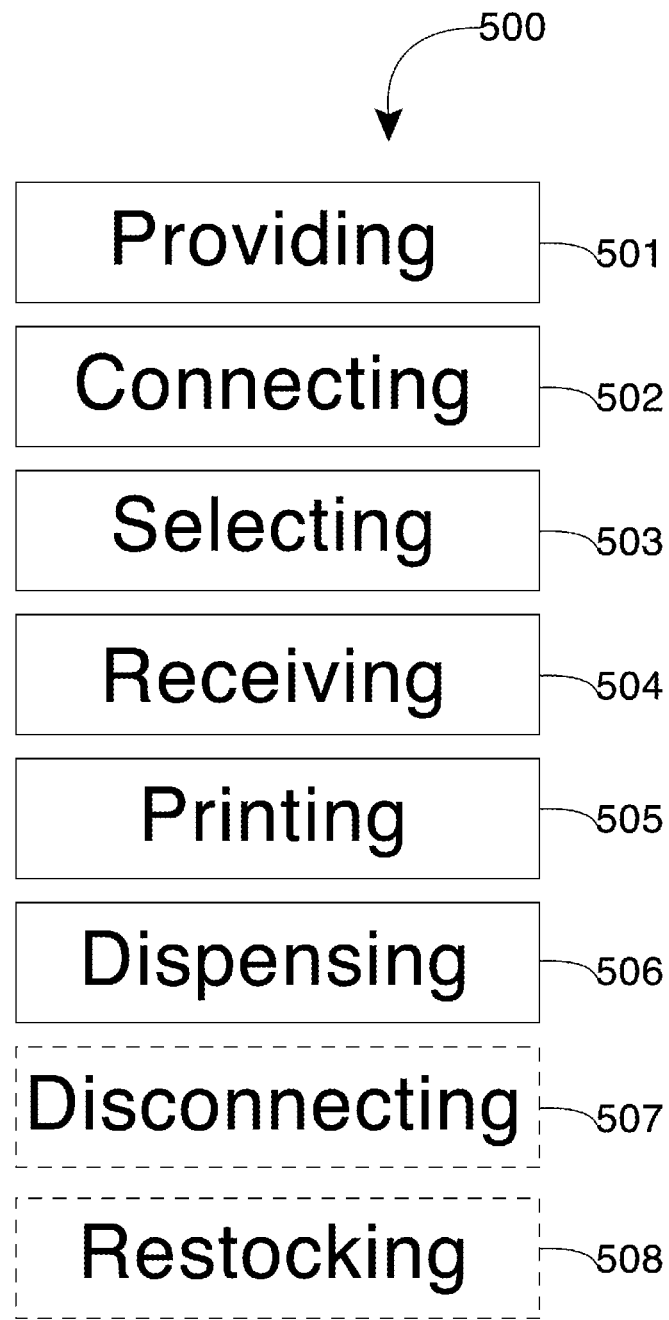
FIG. 5 is a flow diagram illustrating a method of use for personalized souvenir producing interactive kiosk system, according to an embodiment of the present disclosure.

FIG. 5 is a flow diagram 550 illustrating a method of producing personalized souvenir using a personalized souvenir producing interactive kiosk system 500, according to an embodiment of the present disclosure. As illustrated, the method of producing personalized souvenir using a personalized souvenir producing interactive kiosk system 500 may include the steps of: step one 501, providing a personalized souvenir producing interactive kiosk system 100 including a kiosk 110 having a user interface 112 providing a user-interactive display, a payment receiving and processing system 116, a powering source 120, a digital input receiver for receiving a digital-image from an electronic device 20, a housing 114 storing a supply of magnetic sheeting 122, a printer 126 configured to print a user-selected the digital image on a section of the supply of magnetic sheeting 122 stored in the kiosk 110 in response to receiving the digital-image and the payment from the user, and a central processing unit 128 controlling functions of the printer 126; and a dispenser tray 130 for dispensing and delivering a personalized souvenir 10 to the user; step two 502, connecting the electronic device 20 to the kiosk 110 and establishing communication therebetween; step three 503, selecting the digital image from the electronic device 20 using the user interface 112; step four 504, receiving payment via the payment receiving and processing system 116; step five 505, printing the user-selected the digital image on the section of the supply of magnetic sheeting 122; step six 506, dispensing the personalized souvenir 10; step seven 507, disconnecting the electronic device 20 from the kiosk 110; and step eight 508, restocking the supply of magnetic sheeting 122 as needed.

It should be noted that step seven 507 and step eight 508 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for producing personalized souvenir using a personalized souvenir producing interactive kiosk system 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A personalized souvenir producing interactive kiosk system, the personalized souvenir producing interactive kiosk system comprising:
    a kiosk having:
        a user interface providing a user-interactive display;
        a payment receiving and processing system for accepting and processing payment from a user;
        a powering source for powering said kiosk;
    a digital input receiver for receiving a digital-image from an electronic device, said kiosk being in communication with said electronic device;
    a housing storing:
        a supply of magnetic sheeting;
        a printer configured to print a user-selected said digital image on a section of said supply of magnetic sheeting stored in said kiosk in response to receiving said digital-image and said payment from said user; and
        a central processing unit controlling functions of said printer;
        and
    a dispenser tray for dispensing and delivering a personalized souvenir to said user;
wherein said personalized souvenir is a refrigerator magnet;
wherein said payment receiving and processing system is accessible from an exterior of said kiosk and comprises a paper currency acceptor for receiving and processing paper money payments and paper currency storage bin for storage thereof;
wherein said payment receiving and processing system further comprises a mag-stripe reader for reading and processing payment from a payment-card;
wherein said powering source comprises a power cord;
wherein said user interface comprises a touchscreen digital display;
wherein said kiosk further comprises at least one port configured receive a transfer cable and connect with said electronic device for receiving said user-selected said digital-image from said electronic device;
wherein said at least one port is a Universal Serial Bus port configured to transfer said digital-image from said electronic device to said central processing unit;
wherein said kiosk further comprises wireless communication capability for communicating with a remote said electronic device;
wherein said further comprises a cutting press for separating said supply of magnetic sheeting into individual said refrigerator magnet size sections for printing said user-selected digital image thereon;
wherein said kiosk further comprises a database configured to store preprogrammed-templates, preprogrammed-images, and preprogrammed-backgrounds for further customization of said personalized souvenir;
wherein said digital image is selected from a group consisting of a photograph, a graphic image, and said preprogrammed-image;
wherein an orientation of at least one of said digital images is able to be manipulated and customized by said user using said user interface;
wherein said digital image is printed on a top-surface of said refrigerator magnet opposing a magnetic base;
wherein said top-surface comprises a vinyl substrate;
wherein internal components of said kiosk are coated with a non-stick material for aiding in effective dispensing of said personalized souvenir.

* * * * *